(12) United States Patent
Kalhan

(10) Patent No.: US 12,349,138 B2
(45) Date of Patent: Jul. 1, 2025

(54) METHOD OF USING A 2-STAGE SIDELINK CONTROL INFORMATION (SCI) DESIGN

(71) Applicant: Kyocera Corporation, Kyoto (JP)

(72) Inventor: Amit Kalhan, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 636 days.

(21) Appl. No.: 17/611,827

(22) PCT Filed: Jun. 3, 2020

(86) PCT No.: PCT/US2020/035824
§ 371 (c)(1),
(2) Date: Nov. 16, 2021

(87) PCT Pub. No.: WO2020/247428
PCT Pub. Date: Dec. 10, 2020

(65) Prior Publication Data
US 2022/0225313 A1    Jul. 14, 2022

Related U.S. Application Data

(60) Provisional application No. 62/857,151, filed on Jun. 4, 2019.

(51) Int. Cl.
*H04W 72/20* (2023.01)
*H04W 4/06* (2009.01)
(Continued)

(52) U.S. Cl.
CPC ............ *H04W 72/20* (2023.01); *H04W 4/06* (2013.01); *H04W 72/044* (2013.01); *H04W 88/04* (2013.01); *H04W 92/18* (2013.01)

(58) Field of Classification Search
None
See application file for complete search history.

(56) References Cited

U.S. PATENT DOCUMENTS

2004/0203426 A1* 10/2004 Cave .................... H04L 1/0061
455/67.11
2018/0084478 A1    3/2018 Lee et al.
(Continued)

OTHER PUBLICATIONS

Ericsson, On 2-Stage PSCCH Design, Nov. 2018, 3GPP Tsg-Ran WG1 Meeting #95, R1-1813648, pp. 1-4. (Year: 2018).*
(Continued)

*Primary Examiner* — Nicholas Sloms

(57) ABSTRACT

The methods, devices, and systems discussed herein utilize a 2-stage Sidelink Control Information (SCI) design when a forwarding user equipment device (UE) forwards the time-frequency location of communication resources that (1) have been reserved by another UE, or (2) are available for the receiving UE to use for device-to-device (D2D) data transmissions. In some examples, the 1st and 2nd stages of the SCI are required to decode the data channel. In these examples, part of the SCI is in the 1st stage, and the remaining part is in the 2nd stage. Thus, a UE that receives the 2-stage SCI decodes the 1st stage for sensing whether the associated data channel is being used. The 2nd stage has the remaining relevant SCI required to demodulate and decode the same associated data channel.

18 Claims, 5 Drawing Sheets

(51) Int. Cl.
*H04W 72/044* (2023.01)
*H04W 88/04* (2009.01)
*H04W 92/18* (2009.01)

(56) References Cited

U.S. PATENT DOCUMENTS

| | | | |
|---|---|---|---|
| 2018/0227943 A1 | 8/2018 | Xiao et al. | |
| 2019/0052446 A1* | 2/2019 | Cheng | H04W 72/0453 |
| 2020/0092738 A1* | 3/2020 | Ahlström | H04W 8/22 |
| 2020/0236655 A1* | 7/2020 | Bharadwaj | H04W 28/26 |
| 2020/0266857 A1* | 8/2020 | Hwang | H04W 72/23 |
| 2021/0204250 A1* | 7/2021 | Ashraf | H04W 72/56 |
| 2021/0392618 A1* | 12/2021 | Hedayat | H04W 72/20 |
| 2022/0052822 A1* | 2/2022 | Lin | H04L 5/0094 |
| 2022/0061041 A1* | 2/2022 | Chen | H04L 5/0048 |

OTHER PUBLICATIONS

Spreadtrum Communications; "Discussion on physical layer structure for sidelink," R1-1904793; 3GPP TSG RAN WG1 Meeting #96bis; Apr. 2, 2019; Xi'an, CN.
Ericsson; "PHY layer structure for NR sidelink," R1-1905475; 3GPP TSG RAN WG1 Meeting #96bis; Apr. 2, 2019; Xi'an, CN.
Interdigital Inc.; "On Physical Layer Structure for NR V2X Sidelink," R1-1905400; 3GPP TSG RAN WG1 Meeting #96bis; Apr. 3, 2019; Xi'an, CN.

* cited by examiner

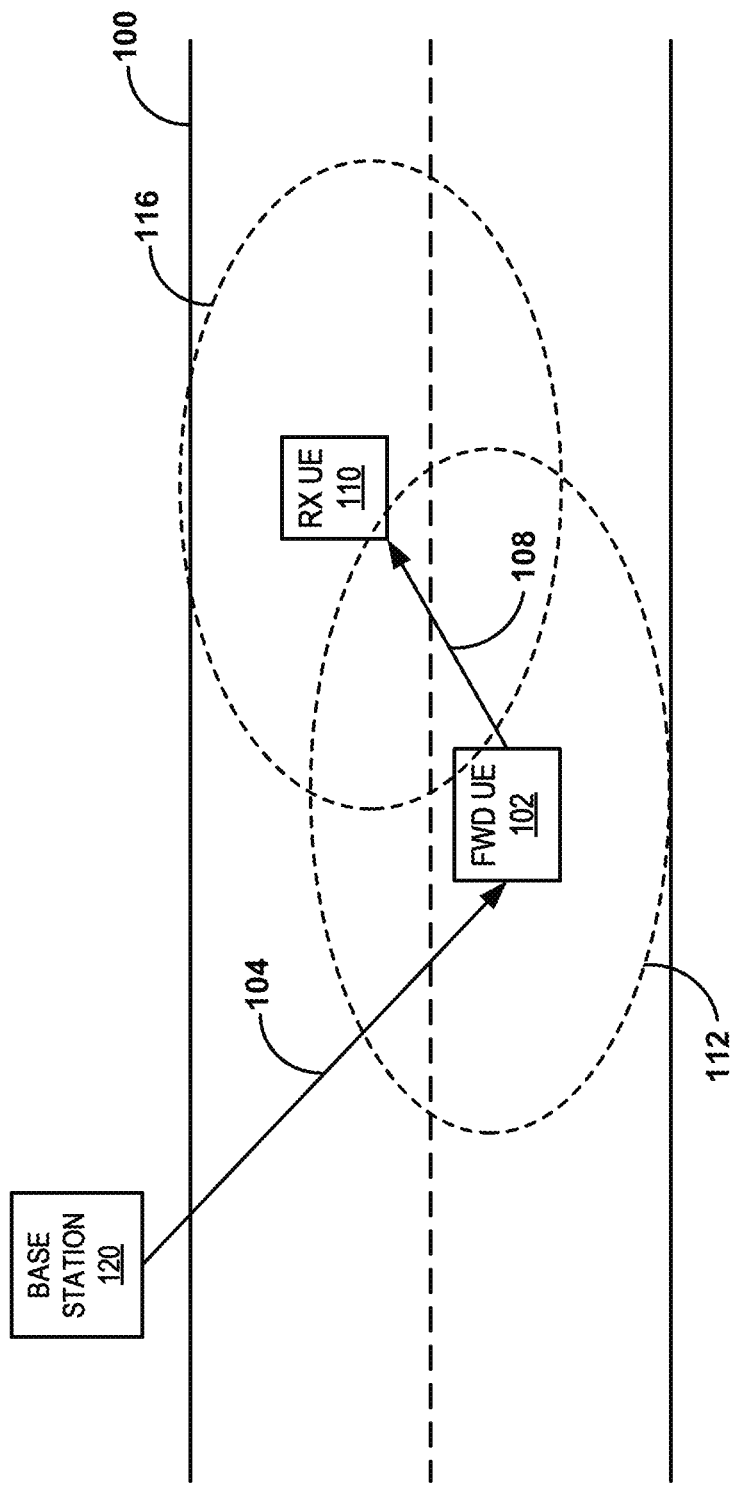

METHOD OF USING A 2-STAGE SIDELINK CONTROL INFORMATION (SCI) DESIGN

CLAIM OF PRIORITY

The present application claims priority to Provisional Application No. 62/857,151, entitled "METHOD TO USE THE 2-STAGE SIDELINK CONTROL INFORMATION (SCI) DESIGN TO SUPPORT THE FORWARDING AND THE UE-RELAY FEATURES", filed Jun. 4, 2019, which is assigned to the assignee hereof and hereby expressly incorporated by reference in its entirety.

FIELD

This invention generally relates to wireless communications and more particularly to vehicle-to-everything (V2X) communications between wireless communication devices.

BACKGROUND

In a network of wireless communication devices, there are times when it may be advantageous to forward signals.

SUMMARY

The methods, devices, and systems discussed herein utilize a 2-stage Sidelink Control Information (SCI) design when a forwarding user equipment device (UE) forwards the time-frequency location of communication resources that (1) have been reserved by another UE, or (2) are available for a receiving UE to use for device-to-device (D2D) data transmissions. In some examples, the $1^{st}$ and $2^{nd}$ stages of the SCI are required to decode the data channel. In these examples, part of the SCI is in the $1^{st}$ stage, and the remaining part is in the $2^{nd}$ stage. Thus, a UE that receives the 2-stage SCI decodes the $1^{st}$ stage for sensing whether the associated data channel is being used. The $2^{nd}$ stage has the remaining relevant SCI required to demodulate and decode the same associated data channel.

BRIEF DESCRIPTION OF THE DRAWINGS

FIG. 1B is a block diagram of an example of the system of FIG. 1A in which the forwarding UE receives the signal that identifies the time-frequency location of communication resources from a base station.

DETAILED DESCRIPTION

The examples discussed below are generally directed to vehicle-to-everything (V2X) communication, which is the passing of information from a vehicle to any entity that may affect the vehicle or that the vehicle may affect. For example, V2X is a vehicular communication system that incorporates other, more specific types of communication, including vehicle-to-vehicle (V2V), V2I (vehicle-to-infrastructure), V2N (vehicle-to-network), V2P (vehicle-to-pedestrian), V2D (vehicle-to-device), and V2G (vehicle-to-grid). There are two types of V2X communication technology depending on the underlying technology being used: wireless local area network (WLAN)-based V2X, and cellular-based V2X (C-V2X). Some examples of V2X protocols include Long-Term Evolution (LTE) (Rel-14) V2X Mode 4 and 5G New Radio (NR) V2X Mode 2.

Sidelink transmissions are supported for V2X over the sidelink (SL) channel or the PC5 interface, which is an interface used for direct communication between a user equipment device (UE) and another UE. Sidelink Control Information (SCI) is control information that is transmitted over the SL channel. In the examples described herein, a forwarding UE transmits forwarded signals that contain a 2-stage SCI.

In some examples, the $1^{st}$ and $2^{nd}$ stages of the SCI are required to decode the data channel. In these examples, part of the SCI is in the $1^{st}$ stage, and the remaining part is in the $2^{nd}$ stage. Thus, a UE that receives the 2-stage SCI decodes the $1^{st}$ stage for sensing whether the associated data channel is being used. The $2^{nd}$ stage has the remaining relevant SCI required to demodulate and decode the same associated data channel. In some examples, the $1^{st}$ stage is transmitted within a Physical Sidelink Control Channel (PSCCH). In some examples, the $2^{nd}$ stage is transmitted within a Physical Sidelink Shared Channel (PSSCH).

The methods, devices, and systems discussed herein utilize the 2-stage SCI design when forwarding the time-frequency location of communication resources that (1) have been reserved, or (2) are available for the receiving UE to use for device-to-device (D2D) data transmissions. Although the different examples described herein may be discussed separately, any of the features of any of the examples may be added to, omitted from, or combined with any other example. Similarly, any of the features of any of the examples may be performed in parallel or performed in a different manner/order than that described or shown herein.

Figure 1A:
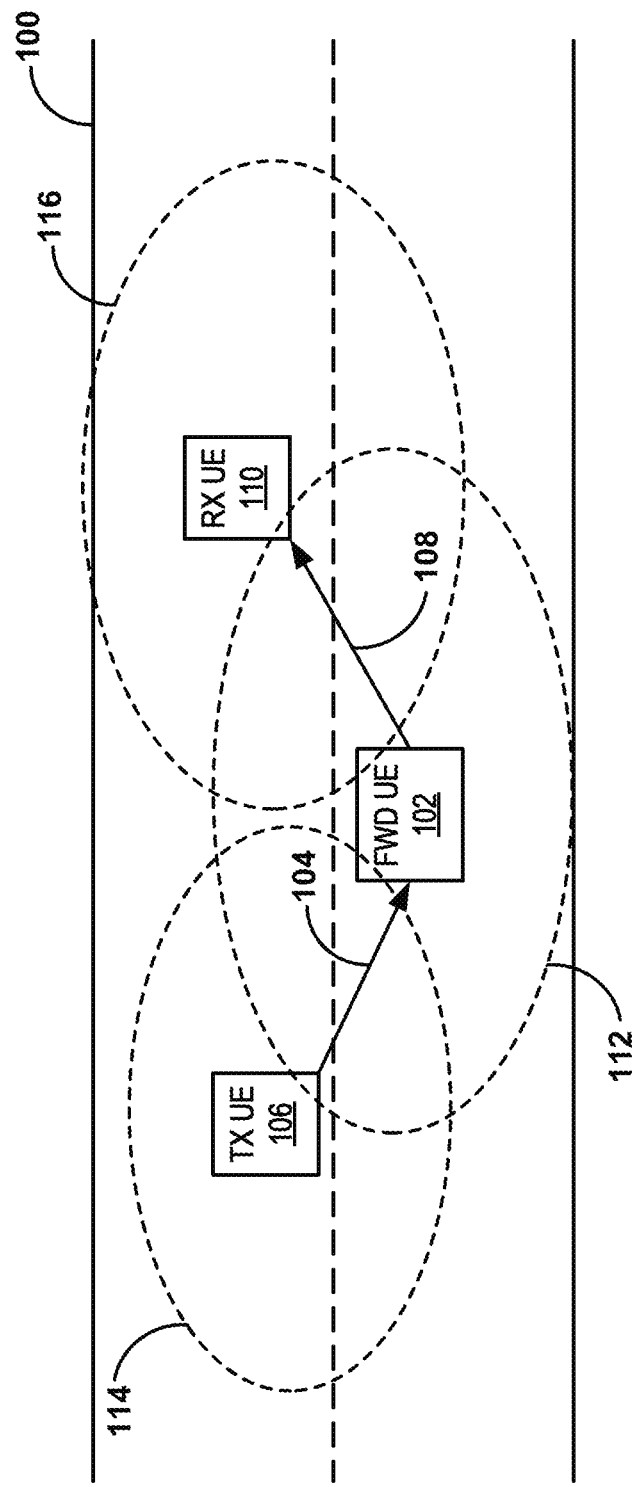
FIG. 1A is a block diagram of an example of a system in which a transmitting user equipment device (UE) transmits a signal, which identifies a time-frequency location of communication resources, to a forwarding UE. The forwarding UE transmits, to a receiving UE, a forwarded signal that includes Sidelink Control Information (SCI) having a $1^{st}$ stage and a $2^{nd}$ stage, the $2^{nd}$ stage including the time-frequency location of communication resources that was identified in the signal received at the forwarding UE.

FIG. 1A is a block diagram of an example of a system in which a transmitting user equipment device (UE) transmits a signal, which identifies a time-frequency location of communication resources, to a forwarding UE. The forwarding UE transmits, to a receiving UE, a forwarded signal that includes Sidelink Control Information (SCI) having a $1^{st}$ stage and a $2^{nd}$ stage. The $2^{nd}$ stage includes the time-frequency location of communication resources that was identified in the signal received at the forwarding UE.

For the example of FIG. 1A, a group of UEs is located on roadway 100. The group includes a transmitting UE, TX UE, 106, a forwarding UE, FWD UE, 102, and a receiving UE, RX UE, 110. In other examples, the group may have a different number of UEs than that shown in FIG. 1A. For example, multiple UEs may act as transmitting UEs, forwarding UEs, and/or receiving UEs. In still further examples, each of the UEs within the group of UEs may be a node of a vehicle ad-hoc network (VANET).

The group of UEs is wirelessly connected to a radio access network (not shown) via one or more base stations (not shown in FIG. 1A), which provide various wireless services to one or more of the UEs that are part of the group of UEs. For the example shown in FIG. 1A, the group of UEs operates in accordance with at least one revision of the 3rd Generation Partnership Project 5G New Radio (3GPP 5G NR) communication specification. In other examples, the group of UEs may operate in accordance with other communication specifications.

In the example of FIG. 1A, UEs 102, 106, 110 are each integrated into a vehicle as an onboard unit (OBU). In other examples, UEs 102, 106, 110 may simply be user equipment (UE) devices that are located within a vehicle. Some examples of user equipment devices include: a mobile phone, a transceiver modem, a personal digital assistant (PDA), or a tablet, for example. Any of the foregoing devices may also be referenced herein as vehicle UEs (VUEs). Each of the UEs 102, 106, 110 that are connected to the group of UEs is considered to be a member of the group.

Figure 2:
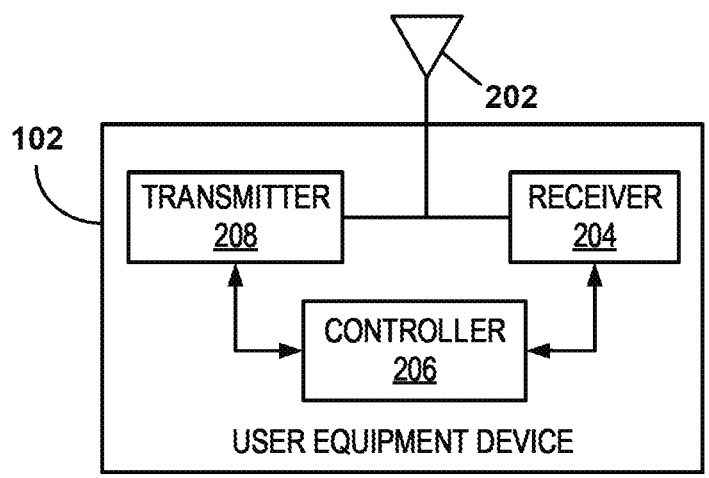
FIG. 2 is a block diagram of an example of the forwarding UE shown in FIG. 1A.

As shown in FIG. 2, UE 102 comprises controller 206, transmitter 208, and receiver 204, as well as other electronics, hardware, and code. Although FIG. 2 specifically depicts the circuitry and configuration of UE 102, the same user equipment device circuitry and configuration is utilized for UEs 106, 110. In other examples, any of the UEs may have circuitry and/or a configuration that differs from that of UE 102 shown in FIG. 2.

UE 102 is any fixed, mobile, or portable equipment that performs the functions described herein. The various functions and operations of the blocks described with reference to UE 102 may be implemented in any number of devices, circuits, or elements. Two or more of the functional blocks may be integrated in a single device, and the functions described as performed in any single device may be implemented over several devices.

Controller 206 includes any combination of hardware, software, and/or firmware for executing the functions described herein as well as facilitating the overall functionality of a user equipment device. An example of a suitable controller 206 includes code running on a microprocessor or processor arrangement connected to memory. Transmitter 208 includes electronics configured to transmit wireless signals. In some situations, the transmitter 208 may include multiple transmitters. Receiver 204 includes electronics configured to receive wireless signals. In some situations, receiver 204 may include multiple receivers. Receiver 204 and transmitter 208 receive and transmit signals, respectively, through antenna 202. Antenna 202 may include separate transmit and receive antennas. In some circumstances, antenna 202 may include multiple transmit and receive antennas.

Transmitter 208 and receiver 204 in the example of FIG. 2 perform radio frequency (RF) processing including modulation and demodulation. Receiver 204, therefore, may include components such as low noise amplifiers (LNAs) and filters. Transmitter 208 may include filters and amplifiers. Other components may include isolators, matching circuits, and other RF components. These components in combination or cooperation with other components perform the user equipment device functions. The required components may depend on the particular functionality required by the user equipment device.

Transmitter 208 includes a modulator (not shown), and receiver 204 includes a demodulator (not shown). The modulator can apply any one of a plurality of modulation orders to modulate the signals to be transmitted over the sidelink channel. The demodulator demodulates signals received over the sidelink channel, in accordance with one of a plurality of modulation orders.

In operation, a wireless communication device (e.g., equipment) transmits, to a forwarding UE, a signal that identifies a time-frequency location of communication resources. In the example of FIG. 1A, the wireless communication device is transmitting UE 106. In the example of FIG. 1B, the wireless communication device is base station 120.

In the example of FIG. 1A, transmitting UE 106 transmits, via its transmitter 208 and antenna 202, a signal 104 that identifies a time-frequency location of communication resources. In some examples, the identified time-frequency location of communication resources is a time-frequency location of communication resources reserved by transmitting UE 106. In other examples, the identified time-frequency location of communication resources is a time-frequency location of communication resources that are available for receiving UE 110 to use for device-to-device (D2D) data transmissions.

Forwarding UE 102 receives, via its antenna 202 and receiver 204, signal 104. Upon receipt of signal 104, forwarding UE 102 determines, using its controller 206, whether to transmit a forwarded signal 108. One possible factor in determining whether to transmit a forwarded signal 108 is whether the forwarded signal 108 would be beneficial to other UEs that are not yet in range of transmitting UE 106.

In the example shown in FIG. 1A, transmitting UE 106 has coverage area 114, forwarding UE 102 has coverage area 112, and receiving UE 110 has coverage area 116. As shown in FIG. 1A, forwarding UE 102 is within the range (e.g., coverage area 114) of transmitting UE 106, but receiving UE 110 is not. Thus, transmitting UE 106 and receiving UE 110 may not be able to reliably communicate with one another. Accordingly, if one or more network-configured criteria are met, forwarding UE 102 will transmit a forwarded signal 108, which is based on signal 104, to receiving UE 110.

In some examples, the determination of whether to transmit the forwarded signal 108 is based, at least partially, on whether a measured received power value of signal 104 is within a threshold range. In some examples, the threshold range corresponds with a distance at which the forwarding UE 102 is located from the wireless communication device (e.g., transmitting UE 106) when packet-collisions are a predominant cause for incorrect Transport Block (TB) reception. For example, under Long-Term Evolution-Vehicle (LTE-V) Release 14 Loss of Signal conditions, packet-collisions are the predominant cause for incorrect TB reception when the distance between the transmitter (e.g., transmitting UE 106) and the receiver (e.g., forwarding UE 102) is up to 250 m. When the distance between the transmitter (e.g., transmitting UE 106) and the receiver (e.g., forwarding UE 102) is larger than 250 m, propagation loss becomes the main cause of incorrect TB reception.

If forwarding UE 102 determines that it should transmit a forwarded signal, forwarding UE 102 uses its controller 206 to generate forwarded signal 108. Forwarding UE 102 transmits, via its transmitter 208 and antenna 202, forwarded signal 108 to receiving UE 110. Forwarded signal 108 includes Sidelink Control Information (SCI) having a $1^{st}$ stage and a 2$^{nd}$ stage. The 2$^{nd}$ stage includes the time-frequency location of communication resources that was identified in signal 104.

In some examples, the 1$^{st}$ stage is transmitted within a Physical Sidelink Control Channel (PSCCH). In examples in which the time-frequency location of communication resources identified in signal 104 is a time-frequency location of communication resources reserved by the transmitting UE 106, the 1$^{st}$ stage of the SCI includes an indication that forwarded signal 108 contains forwarded resource reservation information. For example, an indicator can be set in a 1-bit "forwarding" field or some other field of the 1$^{st}$ stage of the SCI to explicitly or implicitly indicate that the time-frequency location of communication resources included in forwarded signal 108 signifies a forwarded reservation of communication resources, respectively. In this manner, a receiving UE 110 that is interested in receiving information regarding communication resources that have been reserved by other nodes (e.g., UEs) that are not in range (e.g., hidden nodes) can be made aware of the reserved communication resources when it decodes the 2$^{nd}$ stage of the SCI to get information on the reserved communication resources. Of course, the "forwarding" field can have more than 1 bit, in other examples.

In some examples, the 1$^{st}$ stage of the SCI includes an indication that the 2$^{nd}$ stage contains additional control information. For example, an indicator can be set in a 6-bit "2$^{nd}$ Stage SCI" field of the 1$^{st}$ stage of the SCI to indicate that the 2$^{nd}$ stage contains a future release feature. In this manner, a receiving UE 110 that is interested in receiving future release features can be made aware of the presence of a future release feature in the SCI and can decode the 2$^{nd}$ stage of the SCI to get information on the future release feature. Of course, the "2$^{nd}$ Stage SCI" field can have any suitable number of bits, in other examples.

As described above, the 2$^{nd}$ stage of the SCI contains the time-frequency location of communication resources that was identified in signal 104. The 2$^{nd}$ stage of the SCI also contains the control information that an intended receiving UE needs to demodomulate and decode the associated data channel. In some examples, the 2$^{nd}$ stage is transmitted within a Physical Sidelink Shared Channel (PSSCH).

In some examples in which the time-frequency location of communication resources identified in signal 104 is a time-frequency location of communication resources reserved by the transmitting UE 106, the 2$^{nd}$ stage of the SCI includes a 9-bit "Forwarded Reserve Resource Location" field that provides the time-frequency location of the communication resources reserved by transmitting UE 106. In some examples in which the identified time-frequency location of communication resources is a time-frequency location of communication resources that are available for a receiving UE 110 to use for device-to-device (D2D) data transmissions, the 2$^{nd}$ stage of the SCI includes a "Resource Pool Information" field that provides information regarding the communication resources that can be used by receiving UE 110 for device-to-device (D2D) data transmissions.

In some examples, the 2$^{nd}$ stage of the SCI includes a serving cell identifier (ID) associated with a serving cell of transmitting UE 106. For example, an identifier can be set in a "Transmitter UE Serving Cell ID" field of the 2$^{nd}$ stage of the SCI. This information is useful if a receiving UE 110 receives forwarded information from multiple forwarding UEs that are served by different cells.

In other examples, the 2$^{nd}$ stage of the SCI includes Multimedia Broadcast Multicast Service (MBMS) information. For example, an "MBMS Services Information" field of the 2$^{nd}$ stage of the SCI can be used to forward MBMS services (e.g, Temporary Mobile Group Identities) or group communication services (e.g., Group-Radio Network Temporary Identifiers) that are being broadcasted or multicasted from the serving cell of transmitting UE 106.

Regardless of the contents of forwarded signal 108, receiving UE 110 receives, via its antenna 202 and receiver 204, forwarded signal 108. Receiving UE 110 uses its controller 206 to decode forwarded signal 108, including the 2-stage SCI.

FIG. 1B is a block diagram of an alternative example of the system of FIG. 1A in which a forwarding UE receives a signal, which identifies the time-frequency location of communication resources, from a base station instead of from a transmitting UE. More specifically, forwarding UE 102 receives, via its antenna 202 and receiver 204, signal 104 from base station 120.

In the interest of clarity and brevity, only one infrastructure communication node (e.g., base station 120) is shown in FIG. 1B. However, in other examples, any suitable number of infrastructure communication nodes may be utilized to obtain/maintain communication with the network. For the example shown in FIG. 1B, base station 120, sometimes referred to as eNodeB or eNB, transmits signal 104 to forwarding UE 102. In other examples, the infrastructure communication node is a road side unit (RSU).

For the example shown in FIG. 1B, signal 104 is shown as a broadcast downlink signal from base station 120 to forwarding UE 102. Forwarding UE 102 is also capable of transmitting uplink signals (not shown) to base station 120. Base station 120 is connected to the network through a backhaul (not shown) in accordance with known techniques.

Figure 3:
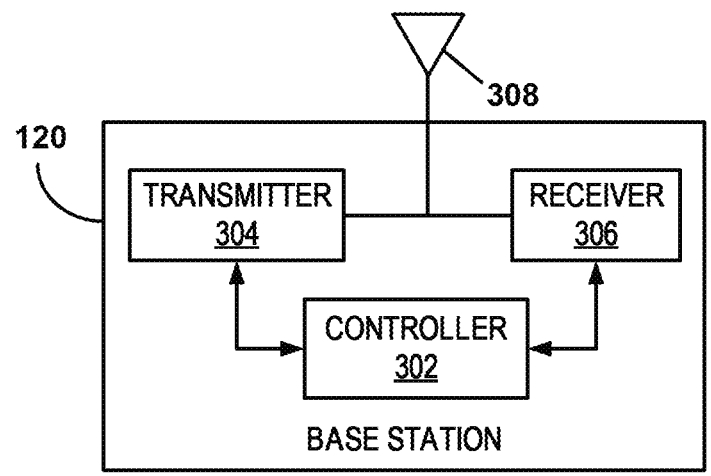
FIG. 3 is a block diagram of an example of the base station shown in FIG. 1B.

As shown in FIG. 3, base station 120 comprises controller 302, transmitter 304, and receiver 306, as well as other electronics, hardware, and code. Base station 120 is any fixed, mobile, or portable equipment that performs the functions described herein. The various functions and operations of the blocks described with reference to base station 120 may be implemented in any number of devices, circuits, or elements. Two or more of the functional blocks may be integrated in a single device, and the functions described as performed in any single device may be implemented over several devices.

For the example shown in FIG. 3, base station 120 may be a fixed device or apparatus that is installed at a particular location at the time of system deployment. Examples of such equipment include fixed base stations or fixed transceiver stations. In some situations, base station 120 may be mobile equipment that is temporarily installed at a particular location. Some examples of such equipment include mobile transceiver stations that may include power generating equipment such as electric generators, solar panels, and/or batteries. Larger and heavier versions of such equipment may be transported by trailer. In still other situations, base station 120 may be a portable device that is not fixed to any particular location. Accordingly, base station 120 may be a portable user device such as a UE device in some circumstances.

Controller 302 includes any combination of hardware, software, and/or firmware for executing the functions described herein as well as facilitating the overall functionality of base station 120. An example of a suitable controller 302 includes code running on a microprocessor or processor arrangement connected to memory. Transmitter 304 includes electronics configured to transmit wireless signals. In some situations, transmitter 304 may include multiple transmitters. Receiver 306 includes electronics configured to receive wireless signals. In some situations, receiver 306 may include multiple receivers. Receiver 306 and transmitter 304 receive and transmit signals, respectively, through antenna 308. Antenna 308 may include separate transmit and receive antennas. In some circumstances, antenna 308 may include multiple transmit and receive antennas.

Transmitter 304 and receiver 306 in the example of FIG. 3 perform radio frequency (RF) processing including modulation and demodulation. Receiver 306, therefore, may include components such as low noise amplifiers (LNAs) and filters. Transmitter 304 may include filters and amplifiers. Other components may include isolators, matching circuits, and other RF components. These components in combination or cooperation with other components perform the base station functions. The required components may depend on the particular functionality required by the base station.

Transmitter 304 includes a modulator (not shown), and receiver 306 includes a demodulator (not shown). The modulator modulates the signals to be transmitted as part of a downlink signal and can apply any one of a plurality of modulation orders. The demodulator demodulates any uplink signals received at base station 120 in accordance with one of a plurality of modulation orders.

As mentioned above, base station 120 provides various wireless services and network connectivity to wireless communication devices (e.g., user equipment devices) within the coverage area of base station 120. Base station 120 provides these services and connectivity by transmitting downlink signal 104, via transmitter 304 and antenna 308, to UE 102. In the example of FIG. 1B, the downlink signal 104 is transmitted in a broadcast System Information Block (SIB) message. Although not explicitly shown in FIG. 1B, base station 120 is capable of receiving uplink signals, via antenna 308 and receiver 306, from wireless communication devices (e.g., user equipment devices) within the coverage area of base station 120.

Figure 4:
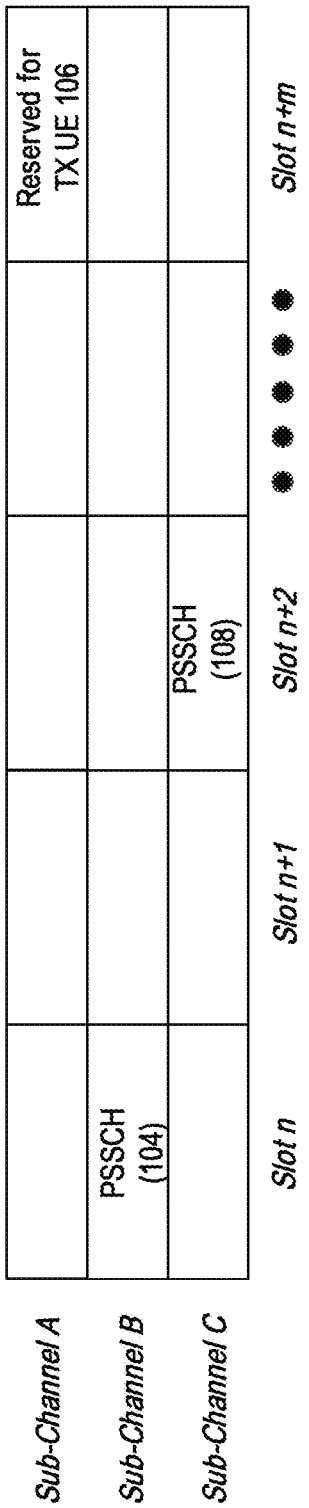
FIG. 4 is a diagram of an example showing the relative time-slots in which the signal 104 and the forwarded signal 108 are transmitted in FIG. 1A.

FIG. 4 is a diagram of an example showing the relative time-slots in which the signal 104 and the forwarded signal 108 are transmitted in FIG. 1A. More specifically, FIG. 4 shows how transmitting UE 106 transmits signal 104 on Sub-Channel B of the PSSCH in Slot n to reserve a resource in Slot n+m. Upon receipt of signal 104 and determining that a forwarded signal should be sent, forwarding UE 102 must send the forwarded signal 108 before its usefulness expires. Thus, after receiving signal 104 in Slot n, forwarding UE 102 must transmit the forwarded signal 108 within a time duration that begins with Slot n+1 and ends with Slot n+m−1 since the reservation is for resources in Slot n+m.

In the example shown in FIG. 4, forwarding UE 102 transmits forwarded signal 108 on Sub-Channel C of the PSSCH in Slot n+2. As described above, the $1^{st}$ stage of the SCI of forwarded signal 108 is transmitted within a Physical Sidelink Control Channel (PSCCH) and contains a 1-bit indicator in a "forwarding" field to indicate that the time-frequency location of communication resources included in forwarded signal 108 signifies a forwarded reservation of communication resources. The $2^{nd}$ stage of the SCI of forwarded signal 108 is transmitted within a Physical Sidelink Shared Channel (PSSCH) and contains a 9-bit "Forwarded Reserve Resource Location" field that provides the time-frequency location of the communication resources (e.g., Sub-Channel A of the PSSCH in Slot n+m) that are reserved for transmitting UE 106.

Figure 5:
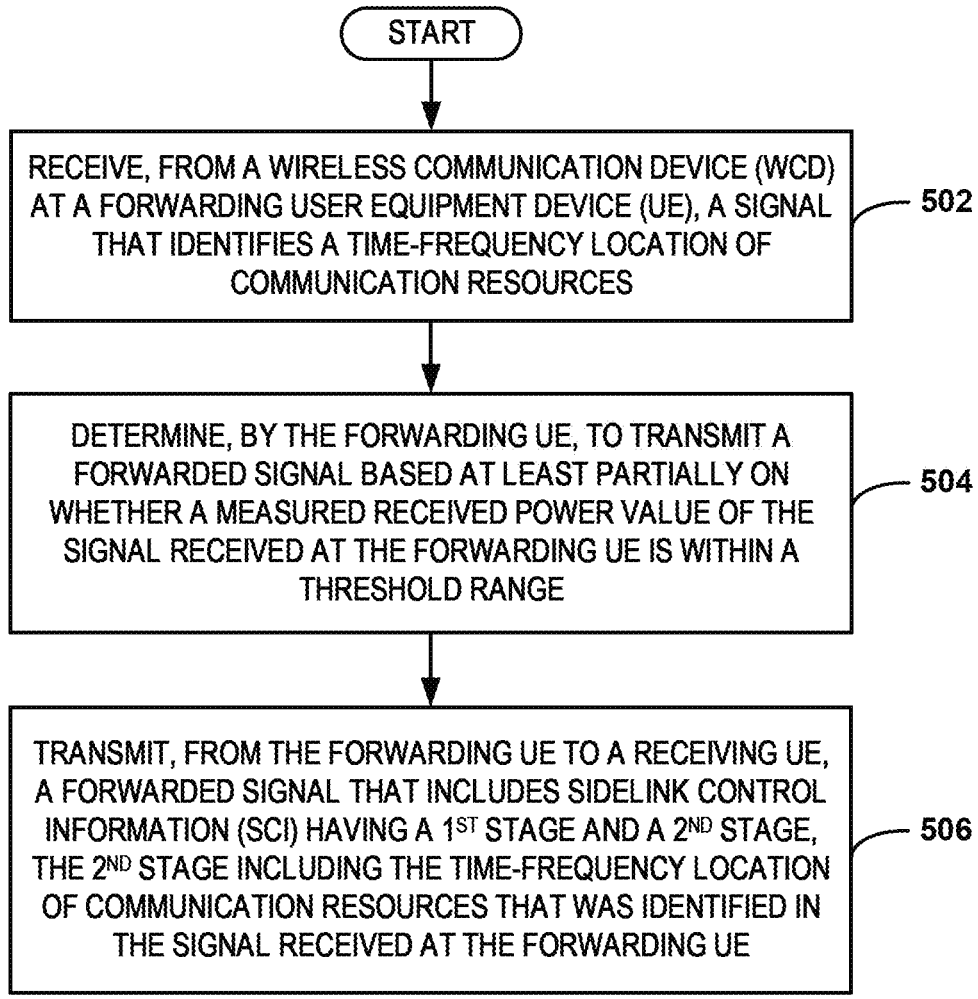
FIG. 5 is a flowchart of an example of a method of forwarding a signal that includes Sidelink Control Information (SCI) having a $1^{st}$ stage and a $2^{nd}$ stage. The $2^{nd}$ stage includes a time-frequency location of communication resources that was identified in a signal received at the forwarding UE.

FIG. 5 is a flowchart of an example of a method of forwarding a signal that includes Sidelink Control Information (SCI) having a $1^{st}$ stage and a $2^{nd}$ stage. The $2^{nd}$ stage includes a time-frequency location of communication resources that was identified in a signal received at the forwarding UE. The method 500 begins at step 502 with receiving, from a wireless communication device at forwarding UE 102, a signal 104 that identifies a time-frequency location of communication resources. At step 504, forwarding UE 102 determines to transmit forwarded signal 108 based at least partially on whether a measured received power value of signal 104 is within a threshold range. At step 506, forwarding UE 102 transmits, to receiving UE 110, forwarded signal 108 that includes SCI having a $1^{st}$ stage and a $2^{nd}$ stage. The $2^{nd}$ stage includes the time-frequency location of communication resources that was identified in signal 104. In other examples, one or more of the steps of method 500 may be omitted, combined, performed in parallel, or performed in a different order than that described herein or shown in FIG. 5. In still further examples, additional steps may be added to method 500 that are not explicitly described in connection with the example shown in FIG. 5.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

The invention claimed is:

1. A method comprising:
   receiving, from a wireless communication equipment at a forwarding user equipment device (UE), a signal that identifies a time-frequency location of communication resources; and
   transmitting, from the forwarding UE to a receiving UE, a forwarded signal that includes Sidelink Control Information (SCI) having a $1^{st}$ stage and a $2^{nd}$ stage, the $1^{st}$ stage including an indication that the forwarded signal contains forwarded resource reservation information, the $2^{nd}$ stage including the time-frequency location of communication resources that was identified in the signal received at the forwarding UE, the forwarded signal based, at least partially, on the signal received at the forwarding UE.

2. The method of claim 1, wherein:
   the wireless communication equipment is a transmitting UE, and
   the time-frequency location of communication resources is a time-frequency location of communication resources reserved by the transmitting UE.

3. The method of claim 2, wherein the $2^{nd}$ stage of the SCI includes a serving cell identifier (ID) associated with a serving cell of the transmitting UE.

4. The method of claim 1, wherein:
   the wireless communication equipment is one of the following: a transmitting UE, and a base station, and
   the time-frequency location of communication resources is a time-frequency location of communication resources that are available for the receiving UE to use for device-to-device (D2D) data transmissions.

5. The method of claim 1, wherein the $2^{nd}$ stage of the SCI includes Multimedia Broadcast Multicast Service (MBMS) information.

6. The method of claim 1, wherein the $1^{st}$ stage of the SCI includes an indication that the $2^{nd}$ stage contains additional control information.

7. The method of claim 1, further comprising:
determining, by the forwarding UE, to transmit the forwarded signal, based at least partially on whether a measured received power value of the signal received at the forwarding UE is within a threshold range.

8. The method of claim 7, wherein the threshold range corresponds with a distance at which the forwarding UE is located from the wireless communication equipment when packet-collisions are a predominant cause for incorrect Transport Block reception.

9. A forwarding user equipment device (UE) comprising:
a receiver configured to receive, from a wireless communication equipment, a signal that identifies a time-frequency location of communication resources; and
a transmitter configured to transmit, to a receiving UE, a forwarded signal that includes Sidelink Control Information (SCI) having a $1^{st}$ stage and a $2^{nd}$ stage, the $1^{st}$ stage including an indication that the forwarded signal contains forwarded resource reservation information, the $2^{nd}$ stage including the time-frequency location of communication resources that was identified in the signal received at the forwarding UE, the forwarded signal based, at least partially, on the signal received at the forwarding UE.

10. The forwarding UE of claim 9, wherein:
the wireless communication equipment is a transmitting UE, and
the time-frequency location of communication resources is a time-frequency location of communication resources reserved by the transmitting UE.

11. The forwarding UE of claim 10, wherein the $2^{nd}$ stage of the SCI includes a serving cell identifier (ID) associated with a serving cell of the transmitting UE.

12. The forwarding UE of claim 9, wherein:
the wireless communication device is one of the following: a transmitting UE, and a base station, and
the time-frequency location of communication resources is a time-frequency location of communication resources that are available for the receiving UE to use for device-to-device (D2D) data transmissions.

13. The forwarding UE of claim 9, wherein the $2^{nd}$ stage of the SCI includes Multimedia Broadcast Multicast Service (MBMS) information.

14. The forwarding UE of claim 9, wherein the $1^{st}$ stage of the SCI includes an indication that the $2^{nd}$ stage contains additional control information.

15. The forwarding UE of claim 9, further comprising:
a controller configured to determine to transmit the forwarded signal, based at least partially on whether a measured received power value of the signal received at the forwarding UE is within a threshold range.

16. The forwarding UE of claim 15, wherein the threshold range corresponds with a distance at which the forwarding UE is located from the wireless communication equipment when packet-collisions are a predominant cause for incorrect Transport Block reception.

17. The method of claim 1, further comprising:
generating the forwarded signal that includes the SCI.

18. The forwarding UE of claim 9, further comprising:
a controller configured to generate the forwarded signal that includes the SCI.

* * * * *